March 24, 1970 — T. J. WICKERS — 3,501,790
METHOD OF MAKING BLIND RIVET ASSEMBLIES
Original Filed May 24, 1965
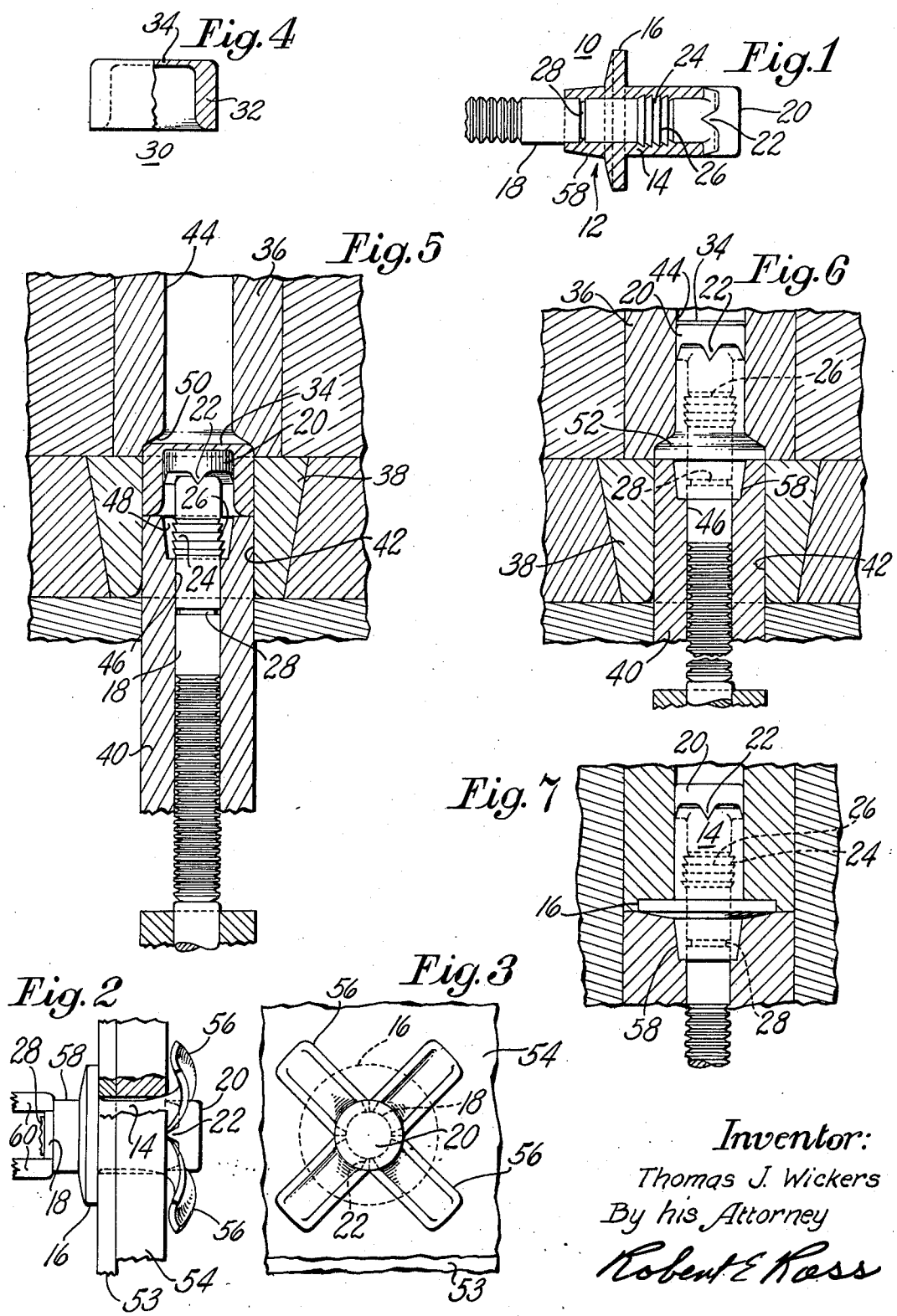
Inventor:
Thomas J. Wickers
By his Attorney
Robert E. Ross United States Patent Office 3,501,790
Patented Mar. 24, 1970

3,501,790
METHOD OF MAKING BLIND
RIVET ASSEMBLIES
Thomas J. Wickers, Trumbull, Conn., assignor to USM
Corporation, Flemington, N.J., a corporation of New
Jersey
Continuation of application Ser. No. 458,213, May 24,
1965. This application Apr. 14, 1967, Ser. No. 630,956
Int. Cl. B21k 1/58
U.S. Cl. 10—27                                    3 Claims

ABSTRACT OF THE DISCLOSURE

A method of manufacturing a rivet by extruding an open ended rivet body in situ about a rivet mandrel.

---

This invention relates generally to a blind rivet assembly and more particularly to a method of manufacture thereof. The present application is a continuation of application for U.S. Letters Patent Ser. No. 458,213, filed May 24, 1965, now abandoned.

Rivet assemblies of the pull-to-set type comprise generally a hollow rivet body having a flange at one end and a setting mandrel retained within the rivet. One end of the mandrel has a setting head disposed outside the rivet body and the other end of the mandrel protrudes from the flanged end of the rivet for grasping by a pulling tool. When the rivet is disposed in a suitable opening in a work piece and the mandrel pulled, the mandrel head pulls inside the rivet body to cause expansion thereof to retain the rivet in the opening.

One of the disadvantages of this type of rivet which has limited its use in certain applications is its limited "pull-up" ability, that is, its ability to draw two superimposed work pieces tightly together. A heretofore proposed method of improving the "pull-up" of such a rivet has been to provide a rivet barrel having longitudinal portions of reduced thickness extending from the end opposite the flange, so that when the mandrel is pulled to set the rivet, the end of the rivet barrel splits into outwardly flaring segments. The outward bending of the segments against the edge of the aperture of the adjacent work piece provides a considerable force to pull the superimposed panels tightly together.

The manufacture of rivet barrels having a structure suitable for the above purpose has been found to be relatively expensive due to the difficulty of forming the longitudinal lines of weakness accurately enough to provide consistent results.

A general object of this invention is to provide an efficient method of manufacturing a rivet assembly of the type described in which means is provided for splitting an un-scored rivet barrel into a plurality of segments when the rivet is set.

A more particular object of the invention is to provide a method of manufacture of a rivet of the type described in which the rivet body is formed in place around the mandrel in such a manner as to insure uniform splitting of the body when the rivet is set.

Other objects of the invention will be apparent to one skilled in the art from the following detailed description of the specific embodiment thereof.

In the drawing,

FIG. 1 is a view in side elevation, partly in section, of a rivet assembly according to the invention;

FIG. 2 is a view in section of the rivet assembly of FIG. 1 after setting in a work piece;

FIG. 3 is a view of the assembly of FIG. 2 as seen from the right side;

FIG. 4 is a view in section of a preform used in the manufacture of the rivet of FIG. 1;

FIG. 5 is a view in section illustrating the rivet mandrel and the preform of FIG. 4 in position in a set of forming dies to produce the rivet of FIG. 1;

FIG. 6 is a view similar to FIG. 5 after the forming does have extruded the preform around the mandrel generally into the desired rivet body shape; and FIG. 7 is a view in section of the rivet in a second set of forming tools illustrating a second and final step in the rivet forming process.

Referring to the drawing, there is illustrated a rivet assembly 10 which comprises generally a rivet 12 comprising a cylindrical barrel 14 having a flange 16 near one end, and a mandrel 18 disposed in the barrel. The mandrel is provided with a setting head 20 disposed outside the barrel at the end opposite the flange.

To provide means for splitting the end of the barrel of the rivet into segments when the rivet is set, the rear side of the head is provided with a group of rearwardly projecting wedges 22 spaced uniformly about the head. In the illustrated embodiment the wedges 22 are sunk into the adjacent end of the rivet barrel for a purpose to appear hereinafter. To prevent removal of the mandrel from the rivet barrel after setting as will appear hereinafter, the mandrel is provided with a series of peripheral grooves 24 which are shaped to form forwardly facing abutments 26. A neck portion 28 is provided in the mandrel in the usual manner to provide a breaking point when the mandrel is pulled to set the rivet.

The rivet assembly 10 may be manufactured by the method illustrated in FIGS. 5–7. The head 20 of a previously formed mandrel is inserted into a cup-shaped pellet 30 which comprises a peripheral wall portion 32 and a thin bottom portion 34. This assembly is placed into a suitable set of forming dies comprising an upper die 36, a lower die 38, and an extrusion plunger 40 movable within the lower die. The lower die has an aperture 42 with a diameter substantially equal to that of the pellet 30 and the upper die has an aperture 44 substantially equal to the diameter of the head 20 of the mandrel.

The extrusion plunger 40 is provided with a central opening 46 having an enlarged portion 48 at the end thereof and the lower end of the opening 44 in the upper die has an enlarged lower portion 50, which cooperates with the enlarged portion 48 of the central opening in the plunger to form the rivet in a manner to appear hereinafter.

The mandrel 18 and the pellet 30 are assembled into the dies in the manner illustrated in FIG. 5 with the pellet disposed in the lower die, the mandrel 18 disposed in the opening 46 in the extrusion plunger and the head 20 of the mandrel disposed within the pellet. Such assembly may be accomplished in any convenient order by suitable automatic apparatus (not shown).

The extrusion plunger 40 is then moved through the lower die 38 toward the upper die. During the initial portion of such movement the mandrel 18 is caused to move at the same rate as the extrusion punch, by any suitable means (not shown). As the head 20 of the mandrel enters the opening 44 of the upper die, the thin web 34 forming the bottom of the pellet is sheared off. On further movement of the extrusion plunger and mandrel forwardly, the mandrel head moves into the opening 44, and the plunger 40 causes the material of the pellet wall 32 of flow inwardly around the portion of the mandrel immediately behind the head to conform to the diameter of the opening 44 into which it is moving. The pressure resulting from the movement of the extrusion die carries the mandrel forwardly and also causes the metal to flow into the grooves 24 and to fill the enlarged open end 48 of the extrusion plunger and the enlarged open end 50 of the upper die. At the end of this operation the rivet barrel has a partially formed flange 52 having a diameter equal to that of the original pellet.

While the method of manufacturing the rivet assembly 10 has been described as comprising the insertion of the cup shaped pellet 30 and the step of shearing off the web 34 it will be understood that the use of the cup shaped pellet while advantageous is not absolutely necessary to the present invention. For example, a ring shaped pellet having material of a volume equal to that of the wall 32 might be used with or without an abutment for locating the pellet with respect to the mandrel head. In the event that no abutment is included in the pellet for its relative positioning on the mandrel head, an appropriate locator may be built into the extruding tool.

If it is desired that the flange have a greater diameter, the rivet assembly may be placed in a second set of forming dies as illustrated in FIG. 7 to form the flange into the desired shape and diameter.

Although it is possible to provide a rivet assembly of the above described type by forming the rivet body independently in a separate operation and subsequently assembling it onto the mandrel, with suitable swaging of the body onto the mandrel, the above described method has been found advantageous in that it insures a close fit of the rivet body around the mandrel which is essential for proper setting of the rivet as will appear hereinafter.

The rivet may be used in the usual manner to secure together two superimposed work pieces 53 and 54 having aligned openings therein. Setting of the rivet is accomplished by pulling the mandrel through the rivet body so that the wedges 22 on the mandrel head split the barrel into segments 56. As the mandrel head approaches the panel, the segments curl outwardly against the adjacent edge of the panel and provide a camming action to draw the two portions of the work tightly together.

The setting of the rivet as described above requires that a considerable pulling force be applied to the rivet mandrel, which must, of course, be resisted by an equal force applied to the rivet body. In the illustrated embodiment of the rivet, the flange 16 is spaced forwardly of the rear end of the rivet providing a collar 58. A tool for setting the rivet may be provided with a nose portion 60 which is adapted to bear only against the end of the collar as the mandrel is being pulled. The force applied thereto during the rivet setting deforms the collar by squeezing it toward the flange which causes material of the collar to be forced inwardly into tight engagement with the mandrel, thereby securely retaining the mandrel in the rivet after the setting operation is completed.

As previously mentioned, it is possible to provide a rivet assembly of the type described by first forming a rivet body and then assembling the mandrel into the body. However, it has been found that rivets so formed have a tendency to split unevenly unless the fit of the mandrel with the rivet body is extremely accurate. In some such cases only a single split in the rivet body is formed when the rivet, is set which results in inadequate pull-up force being applied to the workpiece. Hence one of the advantages of the method of manufacture disclosed herein is the fact that by forming the rivet body directly around the barrel, a perfect fit between the internal surface of the rivet and the external surface of the mandrel is obtained, and the wedges 22 protrude a short distance into the end of the rivet barrel. Splitting of the rivet body into four uniform segments is thereby assured.

Although in the illustrated embodiment four wedges are provided on the mandrel head, it will be understood that more or less wedges may be provided if desired to split the rivet barrel into any desired number of segments.

Since certain various changes may be made in the illustrated method without departing from the scope of the invention, it is intended that all matter contained herein be interpreted in an illustrative and not a limiting sense.

Having thus described my invention, what I claim as new and desire to secure by Letters Patent of the United States is:

1. A method of forming a rivet assembly, comprising providing a mandrel having a stem with a head on one end thereof, providing a cup-shaped rivet body preform having a peripheral wall forming a cavity and a bottom which is thin in relation to the wall thickness, inserting the head of the mandrel into the cavity, forcing the head of the mandrel through the bottom of the preform into a die having a diameter substantially equal to that of the head, and then forcing the preform and the mandrel simultaneously into the die to extrude the preform into a rivet body around the mandrel.

2. The method according to claim 1 further characterized in that the mandrel head is formed with a plurality of wedges projecting from the rear side of the head toward the opposite end of the stem and in which the rivet body in being extruded from the preform is impaled upon the wedges.

3. The method according to claim 1 further characterized in that the mandrel is formed near the head with a least one groove and that during extrusion of the rivet body some of the material of the preform is forced into the groove.

References Cited
UNITED STATES PATENTS
2,779,955  2/1957  Curtis.
3,204,517  9/1965  Looker _____ 85—77

CHARLIE T. MOON, Primary Examiner

U.S. Cl. X.R.

29—432, 511 520, 523; 85—77